United States Patent
Pan et al.

(10) Patent No.: US 12,220,773 B2
(45) Date of Patent: Feb. 11, 2025

(54) WELDING SYSTEM

(71) Applicants: SHENZHEN JASIC TECHNOLOGY CO., LTD., Guangdong (CN); JASIC TECHNOLOGY EUROPE S.R.L., Milan (IT)

(72) Inventors: Lei Pan, Guangdong (CN); Maurizio Terzo, Costabissara (IT); Enrico Cortelazzo, Padua (IT)

(73) Assignees: SHENZHEN JASIC TECHNOLOGY CO., LTD., Guangdong (CN); JASIC TECHNOLOGY EUROPE S.R.L., Milan (IT)

(*) Notice: Subject to any disclaimer, the term of this patent is extended or adjusted under 35 U.S.C. 154(b) by 799 days.

(21) Appl. No.: 17/416,109

(22) PCT Filed: Dec. 20, 2019

(86) PCT No.: PCT/IB2019/061179
§ 371 (c)(1),
(2) Date: Jun. 18, 2021

(87) PCT Pub. No.: WO2020/128994
PCT Pub. Date: Jun. 25, 2020

(65) Prior Publication Data
US 2022/0055139 A1    Feb. 24, 2022

(30) Foreign Application Priority Data
Dec. 20, 2018   (IT) .................. 102018000020578

(51) Int. Cl.
   B23K 9/095    (2006.01)
(52) U.S. Cl.
   CPC .......... B23K 9/0953 (2013.01); B23K 9/0956 (2013.01)

(58) Field of Classification Search
CPC .. B23K 9/0953; B23K 9/0956; B23K 9/1006; B23K 9/1087; B23K 9/16; B23K 9/291;
(Continued)

(56) References Cited

U.S. PATENT DOCUMENTS

2011/0114611 A1* 5/2011 Cole ................. B23K 9/32
                                                       219/136
2012/0325792 A1* 12/2012 Stein ................ B23K 9/32
                                                       219/148
(Continued)

FOREIGN PATENT DOCUMENTS

CN    107635709 A  *  1/2018  .......... B23K 9/0953
CN    107743428 A  *  2/2018  ............ B23K 9/095
(Continued)

OTHER PUBLICATIONS

CN-107635709-A english translation (Year: 2018).*
CN-107743428-A (Year: 2018).*
EP-3290143-A1 (Year: 2018).*

Primary Examiner — Dana Ross
Assistant Examiner — Joseph W Iskra
(74) Attorney, Agent, or Firm — HSML P. C.

(57) ABSTRACT

A welding system (1) comprising a main module (2) equipped with an external casing (3) in which an inlet port (4) for the connection to an external electric power source, an electric generator (5) configured to adapt the electrical characteristics of the electric power received at the inlet to a first type of welding, an outlet port (6) for the connection by means of an electric conductor (10) to a welding torch (20) and an electronic control unit (7) configured to control the functionality of the electric generator (5) are identified. The welding system also comprises a welding torch (20) configured to be connected by means of the electrical conductor (10) to the outlet port (6).

12 Claims, 3 Drawing Sheets

(58) Field of Classification Search
CPC . B23K 9/32; B65D 25/54; B65D 5/54; B65D 5/5445; Y10T 29/49716
USPC .................................................. 219/130.21
See application file for complete search history.

(56) References Cited

U.S. PATENT DOCUMENTS

| | | | | |
|---|---|---|---|---|
| 2013/0208569 A1* | 8/2013 | Pfeifer | ................ | B23K 9/0956 367/129 |
| 2013/0264315 A1* | 10/2013 | Hung | ................ | B23K 9/0956 219/136 |
| 2014/0069895 A1* | 3/2014 | Brine | ................ | H05H 1/3423 219/121.44 |
| 2014/0263247 A1* | 9/2014 | Hillen | ................ | H04B 5/72 219/136 |
| 2014/0266576 A1* | 9/2014 | Hillen | ................ | H04W 4/80 340/5.2 |
| 2015/0352653 A1* | 12/2015 | Albrecht | ............. | B23K 9/0026 219/124.22 |
| 2016/0114418 A1* | 4/2016 | Jones | ................ | B23K 9/1087 219/124.1 |
| 2016/0214198 A1* | 7/2016 | Hsu | ................ | B23K 9/0956 |
| 2017/0036288 A1* | 2/2017 | Albrecht | ............. | B23K 31/125 |
| 2017/0046977 A1* | 2/2017 | Becker | ................ | G09B 19/003 |
| 2017/0227644 A1* | 8/2017 | Boillot | ................ | G01S 17/48 |
| 2017/0282281 A1* | 10/2017 | Fochesatto | ........... | B23K 10/006 |
| 2018/0185950 A1* | 7/2018 | Knoener | ............. | B23K 9/1006 |
| 2018/0243852 A1* | 8/2018 | Hilton | ................ | B23K 9/0953 |

FOREIGN PATENT DOCUMENTS

| | | | | |
|---|---|---|---|---|
| CN | 108311820 A | | 7/2018 | |
| DE | 102017101922 A1 | | 8/2017 | |
| EP | 3290143 A1 | * | 3/2018 | ............... B23K 3/02 |
| WO | 2015073522 A1 | | 5/2015 | |

* cited by examiner

WELDING SYSTEM

CROSS REFERENCE TO RELATED APPLICATION

The present application claims the priory of Italian Patent Application No. 102018000020578 filed on Dec. 20, 2018, and is a National phase of PCT Application No. PCT/IB2019/061179 filed on Dec. 20, 2019, the contents of which are incorporated herein by reference.

TECHNICAL FIELD

The invention relates to a welding system capable of being adapted to be independently configured to a particular type of welding.

The invention also relates to a welding method executed by means of the aforesaid welding system.

BACKGROUND

It is known that the expression "welding process" refers to a technique that allows the physical/chemical joining of two joints.

Welding processes represent a rather large and diversified universe, which over time has adapted to the development of materials and production technologies. On a macroscopic level, it can be said that the processes that have been mostly developed in the industrial sector belong to the group of fusion welding of metallic materials.

These processes use heat, generated in various ways, to melt the base material, which can belong to the joints themselves or can be a filler metal.

The most commonly used processes in the field of metal fusion welding comprise electric arc welding which, specifically, comprises manual welding with coated electrode, defined by the acronym MMA, submerged-arc welding (SAW), continuous wire gas shielded welding (MIG/MAG) and gas shielded welding with nonconsumable electrode (defined with the acronym TIG).

There is also a second macro-category of fusion welding which comprises concentrated energy welding, i.e. all those welding processes that use energy beams that manage to concentrate very high powers on the piece, varying in terms of thousands to several million watts per square millimetre of surface.

In particular, Laser (LBW), electric beam (EBW) and plasma (PAW) weldings belong to this last category.

It is also known that to execute each of the aforesaid different types of welding, the use of a specific welding device is required, comprising an electric power generator specifically configured to adapt the outlet power so as to carry out exclusively the aforesaid specific type of welding or at most a limited number of these types.

Furthermore, it is known that a welding torch specifically configured for carrying out one or more of the aforesaid types of welding must be connected to the aforesaid devices, which torch is capable of supporting a maximum current value and of being predisposed with a particular type of cooling.

It is therefore essential that the operator who must actuate a particular type of welding makes sure to connect the correct welding torch to the device configured to carry out the aforesaid particular type of welding.

Otherwise, i.e. when an unsuitable torch is connected to a specific welding device, this could result in the incorrect execution of the welding, damage to the torch and/or the welding device or even worse an electrical failure that could cause operator injury.

SUMMARY

The present invention aims to overcome the drawbacks of the prior art which have been highlighted so far.

In particular, a first object of the present invention is to realize a welding system capable of preventing the execution of a welding operation in the case of connection of a welding torch that is not compatible with a welding device.

Still more in detail, an object of the invention is to realize a welding system which allows preventing any damage to a welding device and/or a welding torch due to their incorrect connection, since they are not compatible.

Furthermore, another object of the invention is to realize a welding system which prevents any injuries to operators due to the incorrect connection of a welding device with a welding torch that is not compatible with the former.

Not least object of the invention is to realize a welding system which is possibly capable of adapting the operation of a welding device based on the welding torch connected thereto.

The listed objects are achieved by the welding system in accordance with the main claim.

Other characteristics of the invention are described in the dependent claims.

BRIEF DESCRIPTION OF THE DRAWINGS

The listed objects and advantages will be better highlighted below during the description of a preferred but not exclusive embodiment of the invention which is given below, by way of indicative and non-limiting purposes only, with reference to the appended drawings in which.

DETAILED DESCRIPTION

Figure 1:
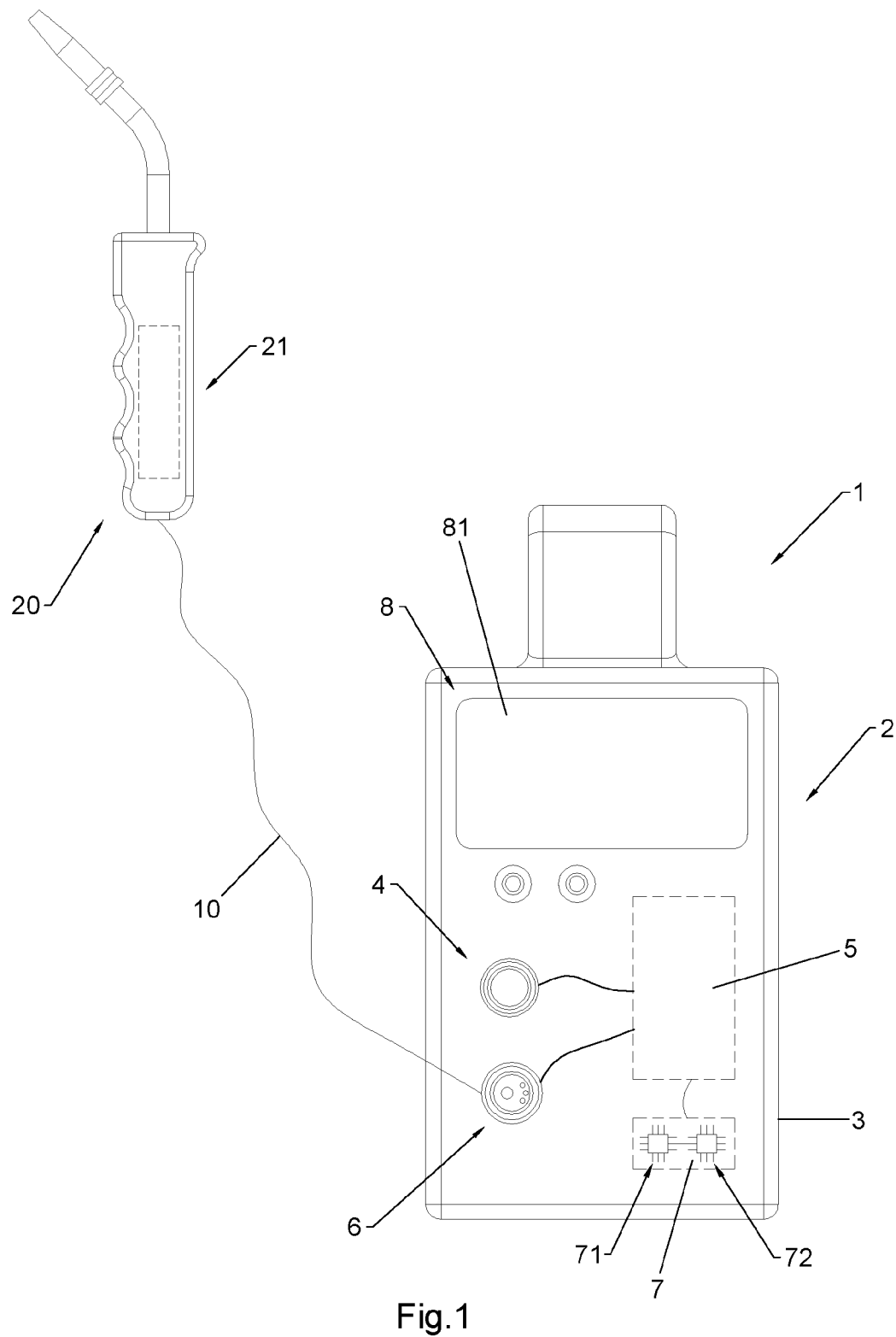
FIG. 1 shows a front view of a preferred embodiment of the welding system of the invention.

The welding system of the invention, according to a preferred embodiment, is represented as a whole in FIG. 1, where it is indicated with 1.

This welding system 1 comprises a main module 2 equipped with an external casing 3 in which an inlet port 4 for the connection to an external electric power source, an electric generator 5 configured to adapt the electrical characteristics of the electric power received at the inlet to a first type of welding and an outlet port 6 for the connection, by means of an electrical conductor 10, of a welding torch 20 are in turn identified.

The aforesaid electric power adapted by the electric generator 5 is supplied at the outlet port 6.

Preferably, this electric generator 5 is configured, according to the preferred embodiment, to adapt the electric power received at the inlet to the execution, alternatively, of the manual welding with coated electrode (MMA), continuous wire gas shielded welding (MIG/MAG) or gas shielded welding with nonconsumable electrode (TIG).

It is not excluded, however, that according to alternative embodiments of the invention, this main module 2 and the relative electric generator 5 are configured to execute only one type of welding or, differently, are configured to allow the execution of welding processes that are different from those indicated above.

The main module 2 also comprises an electronic control unit 7 configured to control the functionality of the aforesaid electric generator 5 based on the type of welding or the types of welding that the electronic generator 5 itself is able to actuate and based on the choice of the operator.

In particular, to allow the operator to select and then execute one of the aforesaid types of welding, the main module 2 comprises a control panel 8, preferably a touch screen display 81, through which it is possible to appropriately set the software loaded on the aforesaid electronic control unit 7.

Preferably, the aforesaid electronic control unit 7 comprises a microprocessor 71 and a data medium 72, the usefulness of which will be described below.

Figure 2:
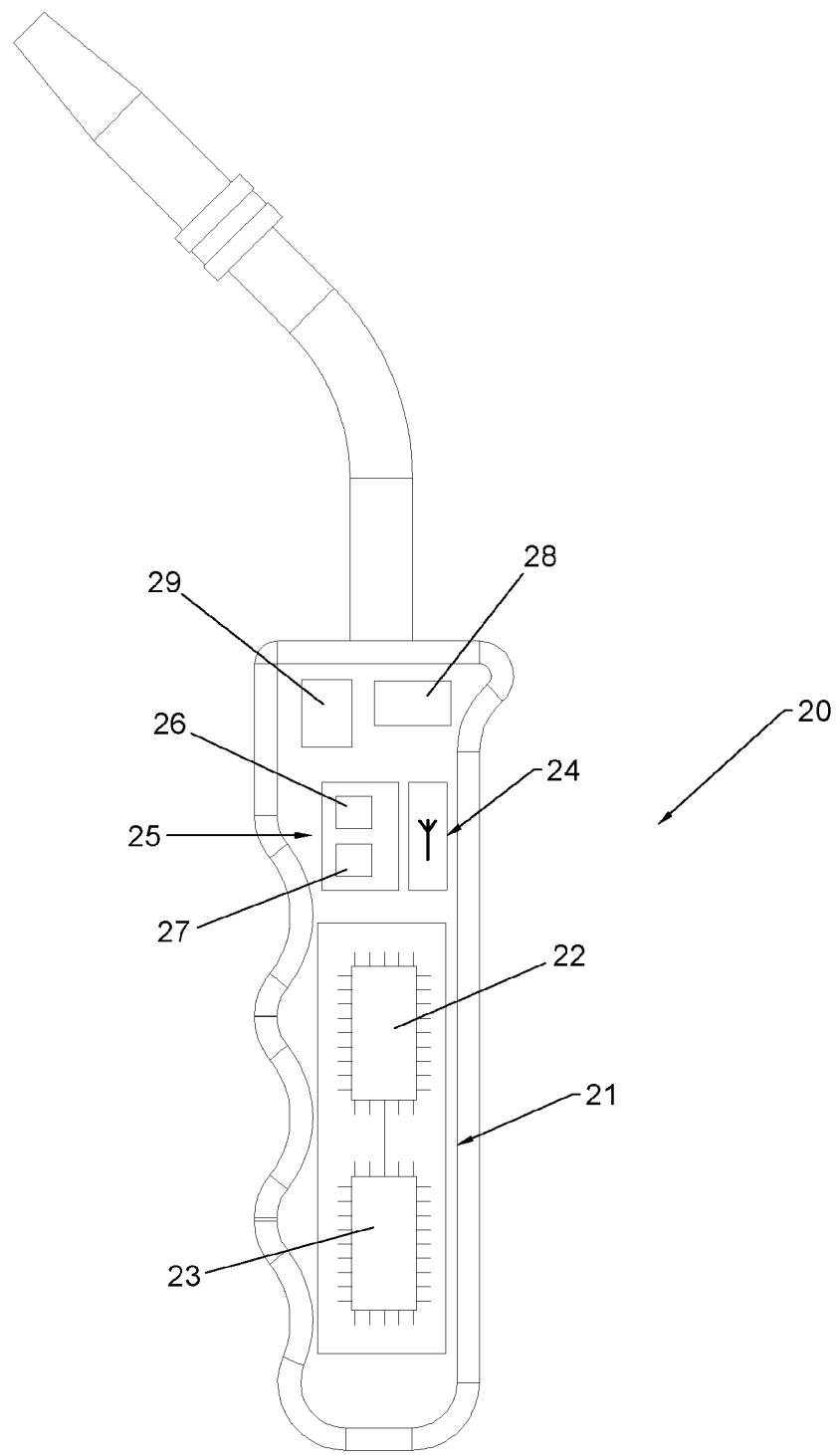
FIG. 2 shows a front view of the detail of the welding torch belonging to the welding system of the invention of FIG. 1.

The welding system of the invention, as can be seen in FIG. 2, also comprises a welding torch 20 configured to be connected, via the aforesaid electrical conductor 10, to the outlet port 6.

As is known, welding torches are configured for the actuation of a type of welding or a limited number of types of welding, based on their own technical characteristics, such as for example the maximum current value that can be supported by the welding torch, and the type of cooling implemented in the latter.

By way of example, according to the preferred embodiment of the invention, the aforesaid welding torch 20 is configured for the execution of manual TIG welding with air cooling and with a maximum predetermined current value.

It should be noted, however, that from now on, when referring to the welding torch 20, this expression comprises all types of torches capable of carrying out at least one of the various types of welding, provided that these welding torches comprise the characteristics reported below.

According to the invention, in fact, the welding torch 20 comprises electronic means 21 which in turn comprise a data medium 22 in which the identification data I of the same welding torch 20 are stored.

According to the preferred embodiment of the invention, the electronic means 21 also comprise a microprocessor 23 capable of communicating and exchanging information with the electronic control unit 7, in particular with the microprocessor 71, when the welding torch 20 is connected to the main module 2.

As regards the identification data I, in particular, according to the preferred embodiment of the invention, they comprise a unique identifying code of the specific welding torch 20 and the type or types of welding that can be actuated with the same welding torch 20.

Furthermore, even more preferably, they also comprise the maximum level of current that can be supported by the welding torch 20, the type of cooling implemented on the welding torch 20 itself and a parameter relating to the maximum limit of use of the welding torch 20.

In particular, as regards the latter data, it preferably comprises at least one value relating to the maximum level of electrical energy that can be supported by the welding torch 20 for the entire life cycle thereof; which electrical energy level therefore represents the maximum limit of use of the welding torch 20 before its performance degrades or even before it breaks down. Below, it will be specifically described how this parameter relating to the maximum limit of use of the welding torch 20 is used by the welding system 1 of the invention.

It is not excluded that, according to alternative embodiments, these identification data I provide for further types of information or provide for other ones than those indicated above, such as for example the ideal value of the ratio between pressure and flow rate of the technical gas used in the various types of welding.

Furthermore, it is not excluded that, according to an embodiment variant of the invention with respect to the preferred one described so far, only the identification data I relating to the unique identifying code of the specific welding torch 20 and the type or types of welding that can be actuated are stored in the aforesaid data medium 22 of the welding torch 20. In this case, the remaining identification data I described above, in particular the parameter relating to the maximum limit of use of the welding torch 20, are stored in the data medium 72 of the electronic control unit 7 of the main module 2. In particular, this data medium 72 could comprise a database where the aforesaid further data are associated with each welding torch 20 with a specific unique identifying code, including the parameter relating to the maximum limit of use of the same welding torch 20.

Still, alternatively, this database could be present on a remote server accessible from the aforesaid main module 2 via a data network.

Always according to the invention, the electronic control unit 7 of the main module 2 is configured, when the welding torch 20 is connected to the outlet port 6, to detect the aforesaid identification data I from the electronic means 21 and to enable the use of the same welding torch 20 if the latter is compatible with the main module 2. More precisely, according to the invention, the use of the welding torch 20 is enabled if this welding torch is configured to actuate the type or one of the types of welding for which the electric generator 5 is configured.

In particular, the electronic control unit 7 is configured to set the operating parameters of the aforesaid electric generator 5 based on the type of welding torch 20 connected to the outlet port 6, in the event that this electric generator 5 is configured to adapt the inlet electric power to more welding types.

More specifically, in the event that all identification data I of the welding torch

20 are stored in the memory medium 22 of the torch itself, the electronic control unit 7 is configured to detect them by communicating with the microprocessor 23 and subsequently to adequately set the operating parameters of the electric generator 5, once the compatibility between the aforesaid welding torch 20 and the main module 2 has been verified.

Alternatively, in the event that such identification data I are partially stored in the data medium 72 of the main module 2, the electronic control unit 7 is configured to detect the unique identifying code of the welding torch 20 connected to the main module 2, so as to identify the identification data I of the specific welding torch 20 in the aforesaid data medium 72 and, obviously, to adequately set the operating parameters of the electric generator 5 on the basis of these detected identification data I, once the compatibility between the aforesaid welding torch 20 and the main module 2 has been verified.

Further, in the event that such identification data I are partially stored in the database of a remote server, the electronic control unit 7 is configured to detect the unique identifying code of the welding torch 20 connected to the main module 2, to communicate with the aforesaid remote server in order to acquire the identification data I of the specific welding torch 20 from the latter and finally to adequately set the operating parameters of the electric generator 5 based on these acquired identification data I, once the compatibility between the aforesaid welding torch 20 and the main module 2 has been verified.

Regardless of which of the aforesaid three alternatives is actually implemented in the welding system 1 of the invention, this operation mode, advantageously, prevents that a main module 2 configured for the actuation of a certain type of welding can be used together with a welding torch 20 configured to actuate a different type of welding, thus achieving the main purposes of the invention.

As regards the operating parameters of the electric generator 5, they mainly concern the value of the electric power generated at the outlet from the same electric generator 5, in particular the voltage and current values, the ratio between pressure and flow rate of the technical gas used in some of the welding processes and, as indicated above, the parameter relating to the maximum limit of use of the specific welding torch.

Figure 3:
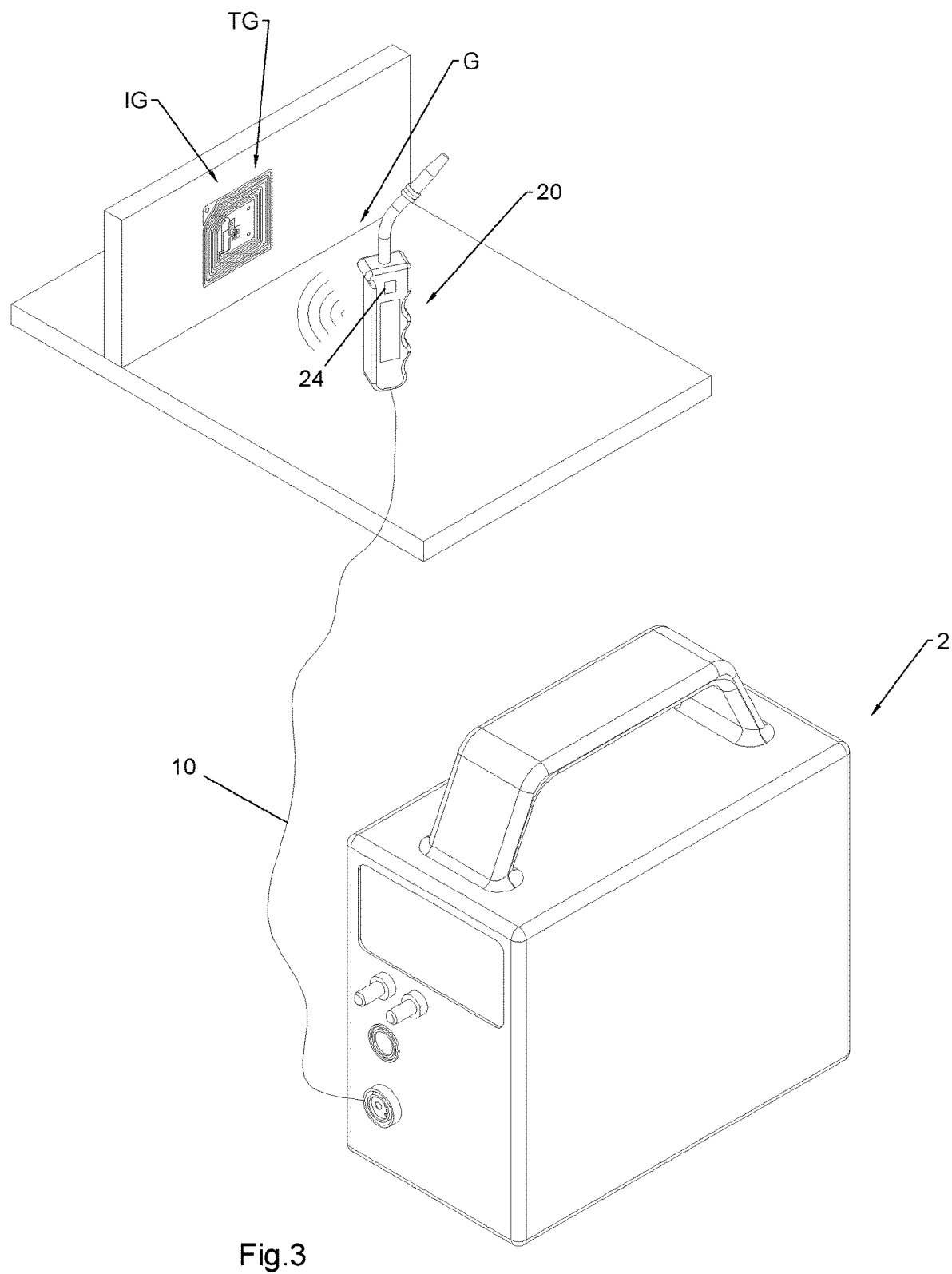
FIG. 3 shows the welding system of the invention of FIG. 1 while reading the information relating to the joint to be welded.

A further aspect of the invention consists in the fact that the welding torch 20, according to the preferred embodiment of the invention, comprises an NFC reader 24 configured to detect the identification data IG of an element, preferably of a joint G, to be welded, stored in a TG RFID tag applied near the same joint G, as shown in FIG. 3.

In particular, by applying a TG RFID tag in the vicinity of this joint G with the information necessary for the correct execution of the welding of the latter, it is possible to advantageously and automatically set the correct operating mode of both the welding torch 20 and of the main module 2 and of the relative electric generator 5.

Therefore, in order to achieve this purpose, first of all, it is necessary that a TG RFID tag containing the information relating to the method of execution of the welding of a specific joint G, or in general of an element, must be placed near the joint G itself.

In a second step, the welding torch 20, connected to the main module 2, must be moved near the TG RFID tag of the joint G.

Furthermore, the welding system 1 of the invention provides for the microprocessor 23 of the welding torch 20 to be configured so as to send the identification data IG of the aforesaid joint G, once they have been read by means of the aforesaid NFC reader 24, to the electronic control unit 7. In turn, the electronic control unit 7 is configured to set the operating parameters of the electric generator 5 based on the type of joint G to be welded.

Obviously, the operating parameters of the electric generator 5 are also set based on the type of welding torch 20, as seen previously.

It is not excluded that, according to different embodiments of the invention, this NFC reader 24 is not present in the aforesaid welding torch 20.

A further aspect of the invention provides that the welding torch 20 itself, according to the preferred embodiment of the invention, comprises an inertial sensor 25 provided in turn with an accelerometer 26 capable of measuring the welding execution speed. In this case, the microprocessor 23 of the same welding torch 20 is configured to send the data relating to the aforesaid speed to the electronic control unit 7 when the welding torch 20 is obviously connected to the main module 2. The electronic control unit 7 is in turn configured to signal to the operator by audio-visual means the correctness or not of the execution of the welding based on the data of the aforesaid speed. In particular, according to the invention, the electronic control unit 7 is configured to compare these speed values with an ideal speed curve for the execution of the specific type of welding, where this curve is stored in the same electronic control unit 7 or it is stored in the TG RFID tag associated with the element/joint G to be welded or it is further made available on a remote server connected via a data network to the welding system 1 of the invention.

Preferably but not necessarily, as already said, the same electronic control unit 7 is configured to signal to the operator by audio-visual means the correctness or not of the execution of the welding based on the aforesaid speed data.

In addition or alternatively, preferably, the electronic control unit 7 is configured to modify the operating parameters of the electric generator 5, in particular the current and voltage values supplied to the welding torch 20, based on the difference between the real displacement speed of the torch and the aforesaid ideal speed curve.

Furthermore, according to the preferred embodiment of the invention, the welding system 1 provides that the aforesaid inertial sensor 25 also comprises a gyroscope 27 for detecting the spatial position of the welding torch 20 during the execution of the welding.

Also in this case, the microprocessor 23 is configured to send the spatial position data to the electronic control unit 7. In turn, the electronic control unit 7 is configured to compare this spatial position data with a curve of ideal spatial positions for the execution of the specific type of welding, where this curve is stored in the same electronic control unit 7 or it is stored in the TG RFID tag associated with the element/joint G to be welded or it is further made available on a remote server connected via a data network to the welding system 1 of the invention.

Furthermore, the same electronic control unit 7 is configured to signal to the operator by audio-visual means the correctness or not of the execution of the welding based on the aforesaid spatial position data, possibly in conjunction with the other described data.

In addition or alternatively, preferably, the electronic control unit 7 is configured to adapt the operating parameters of the electric generator 5, in particular the current and voltage values supplied to the welding torch 20, based on the difference between the real spatial position of the torch and the aforesaid curve of ideal spatial positions.

Furthermore, according to the preferred embodiment of the invention, the electronic control unit 7 is configured to perform further analyses of data acquired by means of the main module 2, such as for example the values of current and voltage absorbed, the gas flow, the gas pressure, any coolant flow, the wire speed and the time of use of the specific welding torch 20. Obviously, the main module 2, in order to be able to acquire the aforesaid data, must be equipped with appropriate sensors of the type known per se.

In particular, the values of current and voltage absorbed and the time of use of the welding torch 20 are used by the electronic control unit 7 to calculate the effective increase in the value of total electrical energy absorbed by the welding torch 20 during its life cycle, so as to compare this value with the aforesaid maximum level of electrical energy that can be supported by the welding torch 20. Furthermore, if such comparison established that the actual value of electrical energy absorbed up to that moment by the specific welding torch 20 equals or exceeds the aforesaid maximum level of electrical energy that can be supported by the torch itself, the electronic control unit 7 is configured to signal the wear of the welding torch 20 to the operator and, in addition or alternatively, to automatically disable the use thereof.

Furthermore, the electronic control unit 7 is preferably configured to analyse the values relating to the gas flow, to the gas pressure, the coolant flow, the wire speed and the time of use of the specific welding torch to determine the state of life of the consumables, always by comparison with curves or ideal values stored in the data medium 22 or in the same electronic control unit 7 or again on a remote server connected via a data network to the welding system 1 of the invention.

Also, according to the preferred embodiment of the invention, preferably but not necessarily, the welding torch 20 comprises a temperature sensor 28 adapted to detect the temperature of the welding torch 20 itself and of the consumables used on the welding torch 20 to execute the welding. Also in this case, the microprocessor 23 is configured to send the data relating to the above temperatures to the electronic control unit 7. The electronic control unit 7 is in turn configured to analyse these data, in particular to compare them with ideal curves of temperatures in order to determine the state of life of the consumables and the state of life of the welding torch 20 itself.

Finally, according to the preferred embodiment of the invention, the welding torch 20 comprises an infrared sensor 29 adapted to detect the temperature of the welding area. Also in this case, preferably but not necessarily, the microprocessor 23 is configured to send the temperature data of the welding area to the electronic control unit 7 when the welding torch 20 is connected to the main module 2. In turn, the electronic control unit 7 is configured to analyse these temperature data of the welding area, in particular to compare them with ideal curves of temperatures of the welding area, so as to determine the quality of the welding, possibly also by simultaneously verifying the data relating to the other measurements performed and described previously.

This set of sensors and analysis allow, in an isolated or correlated manner, to keep under control the quality of the welding being executed and possibly to signal to the operator the corrections to be made to the aforesaid execution of the welding, or to automatically adapt the operating parameters of the electric generator 5.

Furthermore, preferably, the electronic control unit 7 is configured to use this data set acquired by means of the various sensors belonging to the main module 2 and to the welding torch 20 in order to update and adapt, by means of automatic learning algorithms, the identification data I relating to the specific welding torch 20, in particular, the value of the parameter relating to the maximum limit of use of the welding torch 20 and the value relating to the maximum level of current that can be supported by said welding torch 20.

Part of the invention is also the computer programming product comprising a data medium provided with program portions configured in such a way that, when executed on the aforesaid electronic control unit 7 of the main module 2 of the welding system 1 of the invention, they make the same electronic control unit 7 configured in such a way as to verify the compatibility of the welding torch 20 connected to the same main module 2 based on the identification data I detected by the electronic means 21 belonging to the aforesaid welding torch 20.

On the basis of what has been said, it is clear that the welding system 1, object of the invention, achieves the pre-established objects.

In particular, the object of realizing a welding system capable of preventing the execution of a welding operation in case of connection of a welding torch that is not compatible with a welding device is achieved.

The object of realizing a welding system is achieved in detail which allows preventing any damage to a welding device and/or a welding torch due to their incorrect connection, since they are not compatible.

The object of realizing a welding system that prevents any injuries to operators due to the incorrect connection of a welding device with a welding torch that is not compatible with the former is also achieved.

Finally, the object of realizing a welding system which is eventually able to adapt the operation of a welding device based on the welding torch connected thereto is achieved.

The invention claimed is:

1. A welding system comprising:
a main module having an external casing;
the casing having an inlet port for the connection to an external electric power source;
an electric generator housed within the casing and configured to adapt the electrical characteristics of the electric power received at the inlet port to a first type of welding;
the casing having at least an outlet port in electrical communication with the adapted electrical power;
an electronic controller housed within the casing and configured to control the functionality of said electric generator;
a welding torch;
an electrical conductor operative to connect the welding torch electrically to the outlet port;
wherein said welding torch includes an electronic means including a data medium in which identification data of said welding torch are stored;
wherein said electronic controller of said main module being configured, when said welding torch is connected to said outlet port, to detect said identification data from said electronic means if the welding torch is compatible with the main module, to enable the use of said welding torch; and
wherein said welding torch comprises an NFC reader configured to detect the identification data of a joint stored in an RFID tag applied near said joint, a microprocessor being configured to send said identification data to said electronic controller when said welding torch is connected to said main module, said electronic controller being configured to set the operating parameters of said electric generator of said main module based on the type of joint to be welded.

2. The welding system according to claim 1, wherein said data medium comprise a microprocessor capable of communicating and exchanging information with said electronic controller when said welding torch is connected to said main module, said welding torch comprising also an inertial sensor provided with an accelerometer capable of measuring the welding execution speed and a gyroscope for detecting the spatial position of said welding torch, said microprocessor being configured to send the data of said speed and the data of said spatial position to said electronic controller when said welding torch is connected to said main module, said electronic controller being configured to signal to the operator, by audio-visual feedback, the correctness or not of the execution of said welding based on said data of said speed and based on said data of said spatial position.

3. The welding system according to claim 2, wherein said electronic controller is configured to adapt the operating parameters of said electric generator including the current and voltage values to be supplied to said welding torch, based on the difference of a measured speed with respect to an ideal speed curve and based on the difference of said detected spatial position with respect to a curve of ideal spatial positions.

4. The welding system according to claim 1, wherein said electronic controller is configured to set the operating parameters of said electric generator, including to adapt the electric power received at the inlet, based on the type of said welding torch connected to said outlet port.

5. The welding system according to claim 1, wherein said identification data of said welding torch comprise the type or types of welding that can be actuated with said welding torch and a unique identifying code of said welding torch.

6. The welding system according to claim 5, wherein said identification data of said welding torch further comprise the maximum current level that can be supported by said welding torch and the type of cooling implemented on said welding torch.

7. The welding system according to claim 1, wherein said identification data of said welding torch comprise a parameter relating to the maximum limit of use of the welding torch corresponding to the maximum value of electrical energy that can be supported by said welding torch for the entire life cycle of said welding torch.

8. The welding system according to claim 6, wherein said parameter relating to the maximum limit of use of the welding torch, said maximum current level that can be supported by said welding torch and said type of cooling implemented on said welding torch are stored on a data medium belonging to said electronic controller.

9. The welding system according to claim 7, wherein said electronic controller is configured, when said welding torch is connected to said outlet port, to:
   detect said identification data in particular said unique identifying code of said welding torch, from said electronic means;
   identify, in said data medium of said main module, the identification data of said welding torch associated with said unique identifying code of said welding torch said parameter relating to the maximum limit of use of the welding torch, said maximum level of current that can be supported by said welding torch and said type of cooling implemented on said welding torch; and
   set the operating parameters of said electric generator based on the identification data identified for said welding torch.

10. The welding system according to claim 7, wherein said welding torch comprises a temperature sensor adapted to detect the temperature of said welding torch and of consumables used on said welding torch to execute said welding, said microprocessor being configured to send the data of said temperatures to said electronic controller when said welding torch is connected to said main module, said electronic controller being configured to determine the state of life of said consumables and the state of life of said welding torch.

11. The welding system according to claim 3, wherein said welding torch comprises an infrared sensor adapted to detect the temperature of the welding area, said microprocessor being configured to send the data of said temperature of the welding area to said electronic controller when said welding torch is connected to said main module, said electronic controller being configured for determining the quality of said welding based on said data of said temperature of the welding area.

12. A welding method executed through the welding system according to claim 9, said method being characterized in that it provides for the following steps:
   arranging an RFID tag, near a joint of an element to be welded, containing the identification data corresponding to the information necessary for the correct execution of the welding of said element, preferably of said joint;
   moving said welding torch near said RFID tag;
   detecting said identification data by means of said NFC reader of said welding torch;
   sending said identification data to said electronic control unit;
   setting, by said electronic controller the operating parameters of said electric generator based on said identification data of said element associated with a joint of the element to be welded.

* * * * *